United States Patent
Nagata

(10) Patent No.: US 7,748,914 B2
(45) Date of Patent: Jul. 6, 2010

(54) SINGLE-LENS REFLEX CAMERA

(75) Inventor: Hiroshi Nagata, Chofu (JP)

(73) Assignee: Olympus Imaging Corp., Tokyo (JP)

(*) Notice: Subject to any disclaimer, the term of this patent is extended or adjusted under 35 U.S.C. 154(b) by 795 days.

(21) Appl. No.: 11/712,310

(22) Filed: Feb. 27, 2007

(65) Prior Publication Data
US 2007/0212056 A1 Sep. 13, 2007

(30) Foreign Application Priority Data
Mar. 8, 2006 (JP) .............................. 2006-062683

(51) Int. Cl.
G03B 13/02 (2006.01)
G03B 19/12 (2006.01)
(52) U.S. Cl. ...................... 396/354; 396/374
(58) Field of Classification Search ................. 396/354, 396/358, 374
See application file for complete search history.

(56) References Cited
U.S. PATENT DOCUMENTS
6,639,626 B1 * 10/2003 Kubo et al. .............. 348/218.1
7,440,692 B2 * 10/2008 Okumura ................ 396/374

FOREIGN PATENT DOCUMENTS
JP 2000-175100 6/2000

* cited by examiner

Primary Examiner—W. B. Perkey
(74) Attorney, Agent, or Firm—Straub & Pokotylo; John C. Pokotylo

(57) ABSTRACT

A single-lens reflex camera has a first image pickup device as a main image pickup device, a second image pickup device for live-view observation, a reflection mirror which switches an optical path between an optical path directed toward the first image pickup device and an optical path directed toward the second image pickup device, and a control section. When the shooting operation is instructed with the second image pickup device driven and a live-view displayed, the control section starts driving the reflection mirror to retract the reflection mirror from the optical path, and stops the second image pickup device and starts driving the first image pickup device while the reflection mirror is driven in a retracting direction.

7 Claims, 6 Drawing Sheets

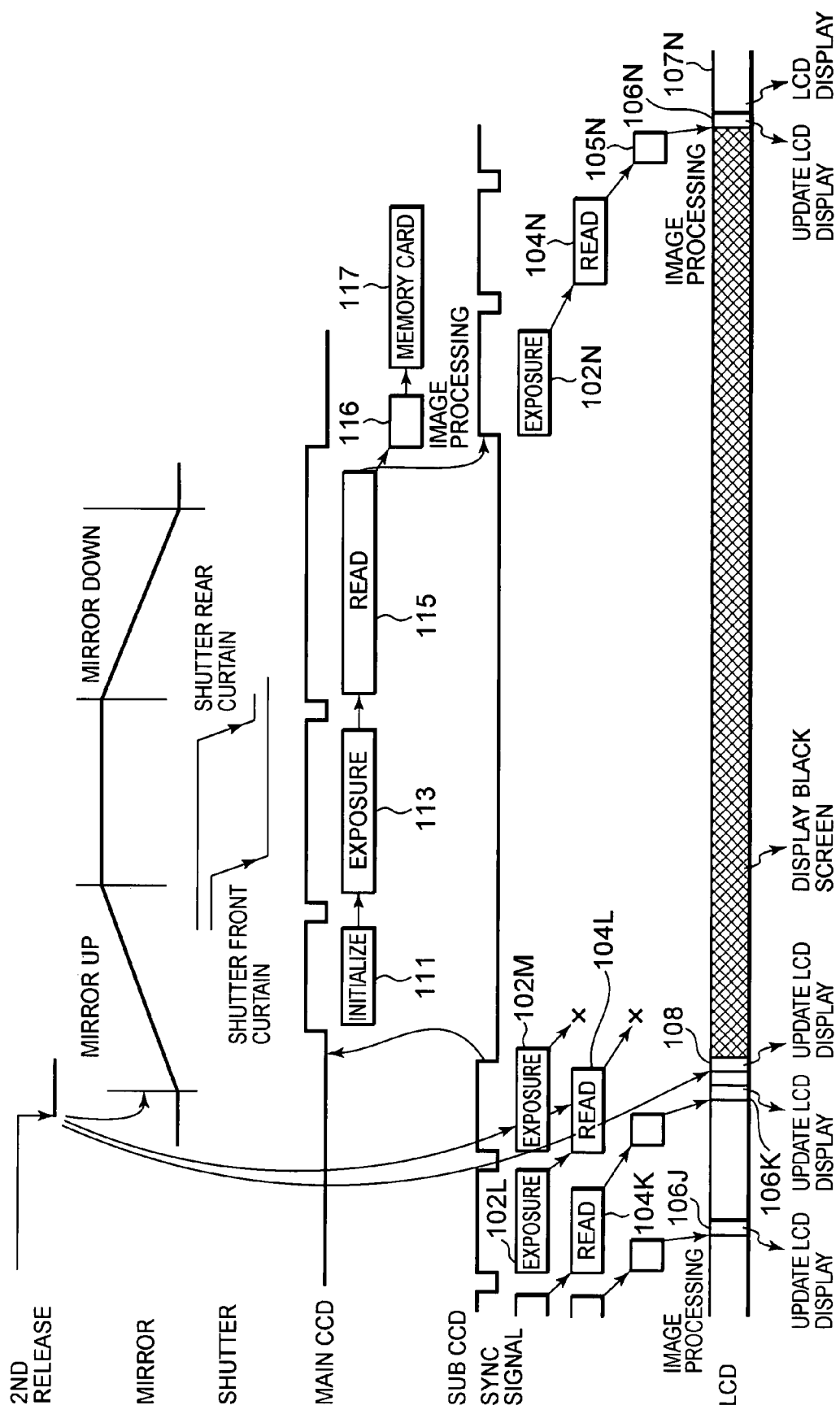

SINGLE-LENS REFLEX CAMERA

CROSS REFERENCES TO RELATED APPLICATION

This application is based upon and claims the benefit of priority from prior Japanese Patent Application No. 2006-062683, filed on Mar. 8, 2006, the entire contents of which are incorporated herein by reference.

BACKGROUND OF THE INVENTION

1. Field of the Invention

The present invention relates to a single-lens reflex camera having a plurality of image pickup devices, and more particularly, to a single-lens reflex camera having a so-called live-view display function (also called "through screen display function" or "electronic viewfinder function").

2. Description of the Related Art

With conventional digital cameras, a user or photographer view a subject image through an optical viewfinder. Recently, digital cameras have been proposed which present a live-view display without an optical viewfinder or present a live-view display with an optical viewfinder equipped and using the output of an image pickup device.

For example, Japanese Patent Laid-Open No. 2000-175100 discloses a digital single-lens reflex camera in which a sub image pickup device for shooting a moving picture is removably mounted in a finder optical path in addition to a main image pickup device for recording still picture data. With the sub image pickup device mounted, the digital single-lens reflex camera can display a live-view on a display device based on the output of the sub image pickup device. The digital camera is a single-lens reflex camera of a type which switches the optical path for the light beam of a subject either to the main image pickup device for recording a still picture or the optical viewfinder. To observe a subject image on a monitor device of this single-lens reflex camera, it is necessary to move a movable mirror in the finder optical path upward to guide the light beam of the subject toward the image pickup device for recording.

BRIEF SUMMARY OF THE INVENTION

A single-lens reflex camera according to the present invention has a first image pickup device as a main image pickup device, a second image pickup device for live-view observation, a reflection mirror which switches an optical path between an optical path directed toward the first image pickup device and an optical path directed toward the second image pickup device, and a control section. When the shooting operation is instructed at the time that the second image pickup device is driven and a live-view is displayed, the control section starts driving the reflection mirror to retract it from the optical path. During the drive of the reflection mirror to a retracting direction, the control section further set the second image pickup device to a non-operating state and starts driving the first image pickup device.

As an exemplary structure of the present invention, a single-lens reflex camera having a reflection mirror that allows a subject image formed by a photographing lens to be observable through an optical viewfinder in a non-shooting mode and is retracted from an optical path to allow a first image pickup device for recording to capture the subject image formed by the photographing lens in a shooting mode includes: a second image pickup device that captures the subject image formed by the photographing lens for live-view observation in the non-shooting mode; a display section that displays at least the subject image captured by the second image pickup device as a live view; a release'switch that instructs a shooting operation; and a control section that selectively controls the first and second image pickup devices, wherein when the shooting operation is instructed with the second image pickup device driven and a live-view displayed on the display section, the control section starts driving the reflection mirror to retract the reflection mirror from the optical path, and further controls to make the second image pickup device in a non-operating condition and starts driving the first image pickup device while the reflection mirror is being driven in a retracting direction.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 6 is a timing chart illustrating the operation of the digital single-lens reflex camera according to the embodiment when a shooting operation starts.

DETAILED DESCRIPTION OF THE PREFERRED EMBODIMENT

A preferred embodiment of the invention will now be described with reference to the accompanying drawings.

Figure 1:
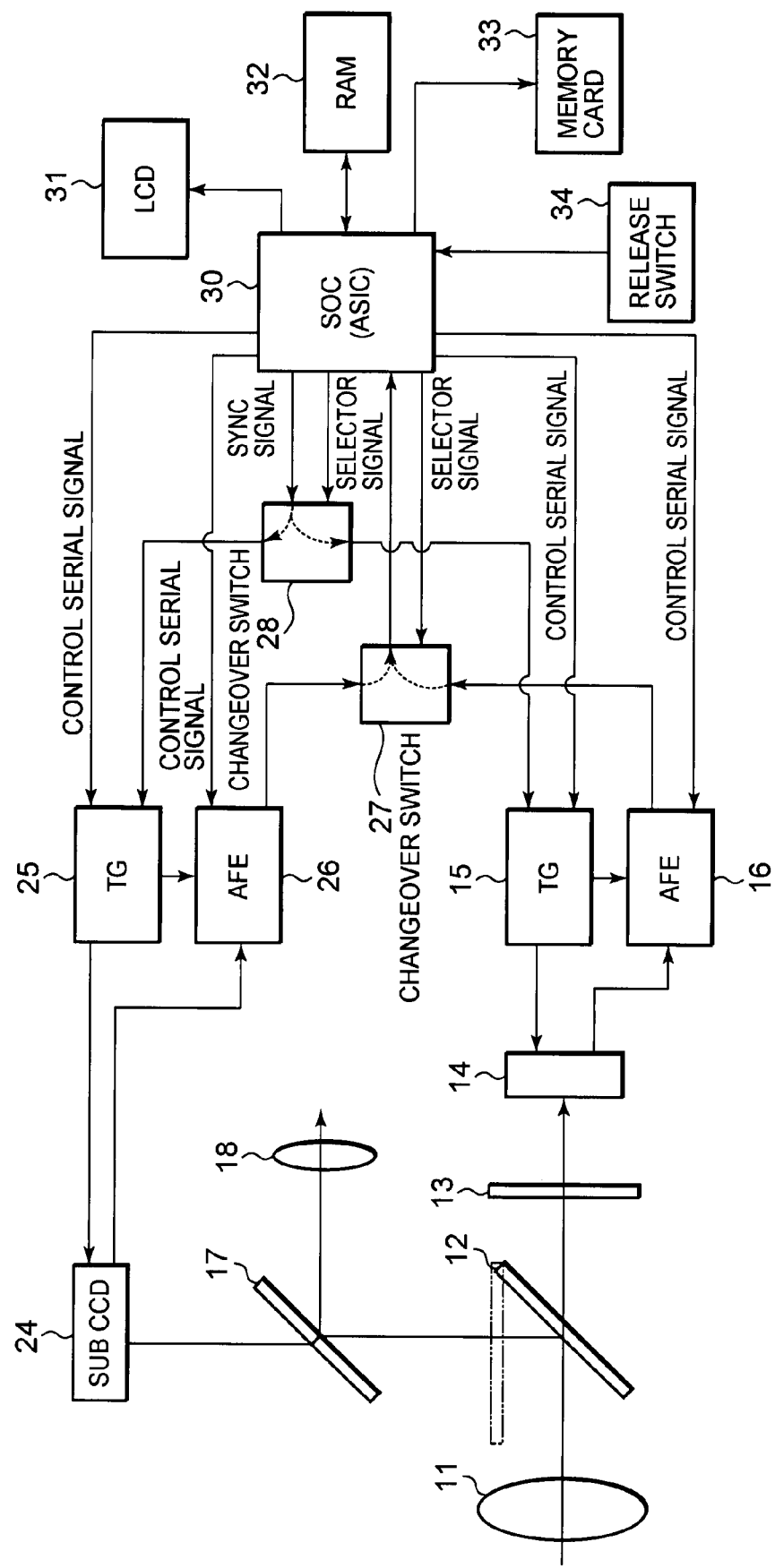
FIG. 1 is a block diagram showing the electric system of a digital single-lens reflex camera according to an embodiment to which the present invention is adapted.

FIG. 1 is a block diagram mainly showing the electric configuration of a digital single-lens reflex camera according to the embodiment. A photographing lens 11 for adjusting the focus and the focal distance is disposed inside a lens barrel (not shown). The photographing lens 11 is driven by a drive mechanism (not shown). In the camera body, a movable mirror 12 is disposed on the optical axis (shooting optical path) of the photographing lens 11. The movable mirror 12 is moved down at an inclination of 45 degrees to the optical axis as indicated by a solid line when a subject image is observed with a finder optical system. When a shooting operation is instructed through a release switch 34 which operates in response to the action of a shutter release button, the movable mirror 12 is rotated about one end and moved upward to be in parallel to the optical axis as indicated by a two-dot chain line.

A focal plane type shutter 13 is disposed at the back of the movable mirror 12. The shutter 13 has a shutter front curtain and a shutter rear curtain, and is configured so that the shutter rear curtain travels after a time according to the shutter time passes since traveling of the shutter front curtain. A main CCD (Charge Coupled Device) 14 as a first image pickup device is disposed at the back of the shutter 13. The main CCD 14 is a two-dimensional image pickup device for photoelectrically converting the subject image formed by the photographing lens 11. The main CCD 14 is connected to a timing generator (hereinafter abbreviated as "TG") 15 as a part of a first signal processing circuit. A sync signal which is used in reading or so an analog image signal from the main CCD 14 is supplied to thereto from the TG 15. The output of the main CCD 14 is connected to a signal processing circuit (analog front end circuit (hereinafter "AFE") 16 as a part of a first signal processing circuit. The AFE 16 reads an image signal from the main CCD 14, adjusts a difference between the image signal and the output of a sub CCD 24 to be described later, amplifies (adjusts the gain of) the analog image signal, and performs AD conversion to convert the analog image signal to a digital signal. The TG 15 and the AFE 16 are connected together for synchronization.

A half mirror 17 which constitutes a part of the finder optical system is disposed in a reflection optical path with the movable mirror 12 moved down. An eyepiece lens 18 which constitutes a part of the finder optical system is disposed in an optical path where a part of the light beam of the subject is reflected. The sub CCD 24 as a second image pickup device is disposed in a transmission optical path of the half mirror 17. The sub CCD 24 is also a two-dimensional image pickup device for photoelectrically converting the subject image formed by the photographing lens 11. It is to be noted that besides a CCD, a two-dimensional image pickup device such as a CMOS (Complementary Metal Oxide Semiconductor) can be used for the main CCD 14 and the sub CCD 24. Since the sub CCD 24 is used for displaying a subject, a CCD having fewer pixels than the main CCD 14 can be used as the sub CCD 24. Connected to the sub CCD 24 are a TG 25 having a function similar to that of the TG 15 and an AFE 26 having a function similar to that of the AFE 16.

The outputs of the AFE 16 and the AFE 26 are connected to a changeover switch 27. The changeover switch 27 is connected to an SOC (System-On-a-Chip semiconductor) 30 in such a way as to receive a selector signal from the SOC 30 and selectively sends the output of either the AFE 16 or the AFE 26 to the SOC 30 according to the selector signal. The inputs of the TG 15 and the TG 25 are connected to a changeover switch 28. The changeover switch 28 is connected to the SOC 30 in such a way as to receive the selector signal from the SOC 30 and selectively input the sync signal output from the SOC 30 to either the TG 15 or the TG 25.

The SOC 30 is an ASIC (Application Specific Integrated Circuit) including a CPU. The SOC 30 sends a control serial signal to the TG 15, the TG25, the AFE 16 and the AFE 26, sends the selector signal to the changeover switches 27 and 28, and the sync signal to the changeover switch 28. The output signal of the AFE 16 or the AFE 26 is input to the SOC 30 via the changeover switch 27. The SOC 30 is connected to a liquid crystal display monitor (hereinafter "LCD") 31, a RAM (Random Access Memory) 32, a memory card 33, and a release switch 34.

The LCD 31 is arranged at the back of the camera body, and serves as a display section to display a subject image, a shooting mode screen and a menu mode screen. The RAM 32 is a memory to temporarily store image data based on the output of the main CCD 14 and the sub CCD 24. The memory card 33 is a rewritable recording medium such as an xD Picture Card (registered trademark), Compact Flash (registered trademark), SD Memory Card (registered trademark) or Memory Stick (registered trademark), and is mountable to the camera body. The release switch 34 includes a first release switch which is enabled to instruct a shooting preparation operation with the shutter release button half pressed, and a second release switch which is enabled to instruct a shooting operation with the shutter release button pressed fully.

The SOC 30 is connected to the aforementioned circuits or so, and performs image processing, such as color correction, gamma ($\gamma$) correction, contrast correction, or monochrome/color mode processing, on a digital image signal input via the changeover switch 27. The SOC 30 compresses digital image data by a compression system such as JPEG (Joint Photographic Coding Experts Group), decompresses digital image data recorded by the JPEG system, and performs display control on the LCD 31 and controls writing/reading of digital image data into/from the memory card 33.

The operation of the digital single-lens reflex camera according to the embodiment will be described referring to flowcharts shown in FIGS. 2 and 3. The CPU in the SOC 30 which serves as a control section performs a multi-task process; the flowchart for controlling the main CCD shown in FIG. 2 and the flowchart for controlling the sub CCD shown in FIG. 3 are processed in parallel.

Figure 2:
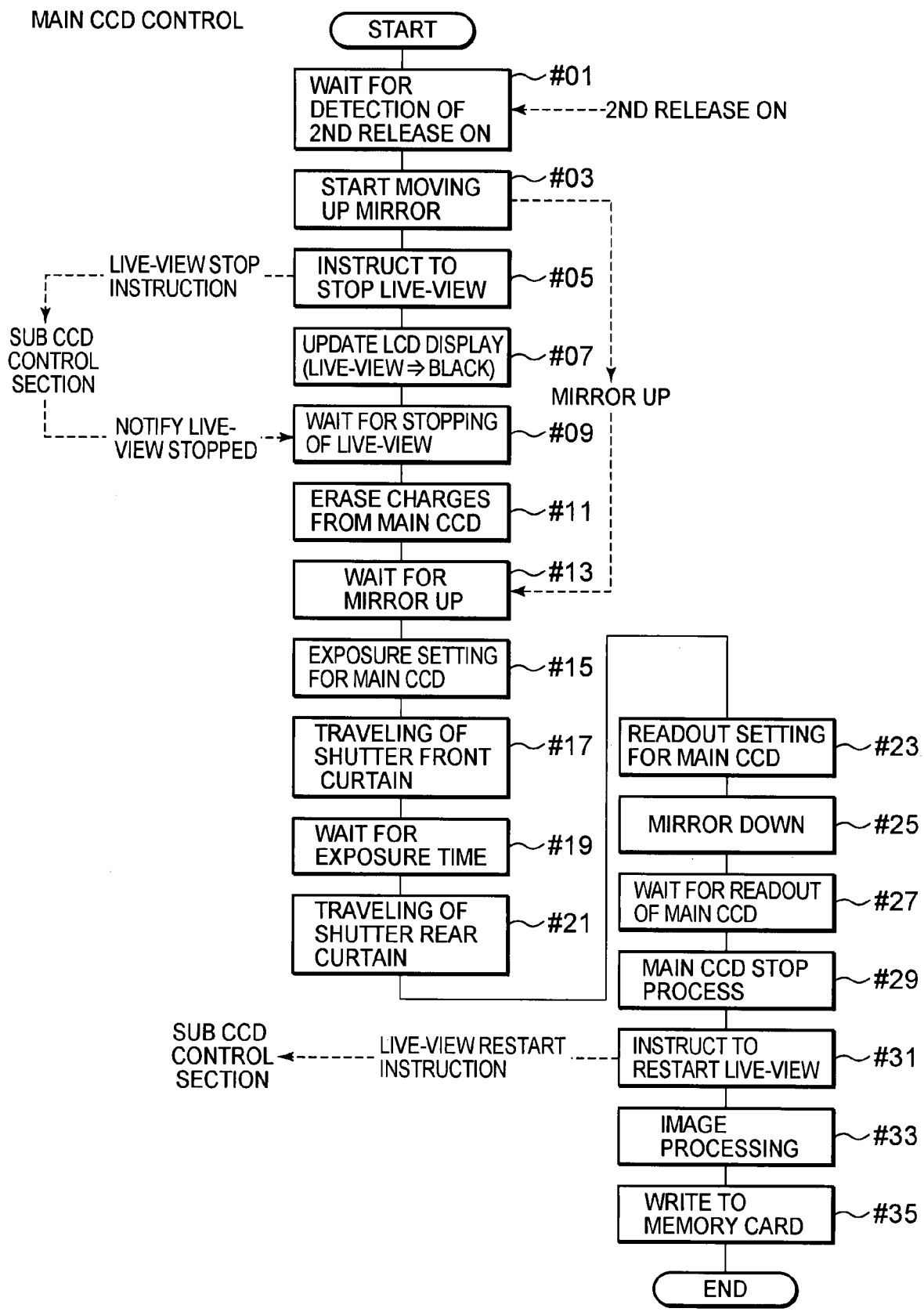
FIG. 2 is a flowchart mainly illustrating the operation of a main CCD of the digital single-lens reflex camera according to the embodiment.
Figure 3:
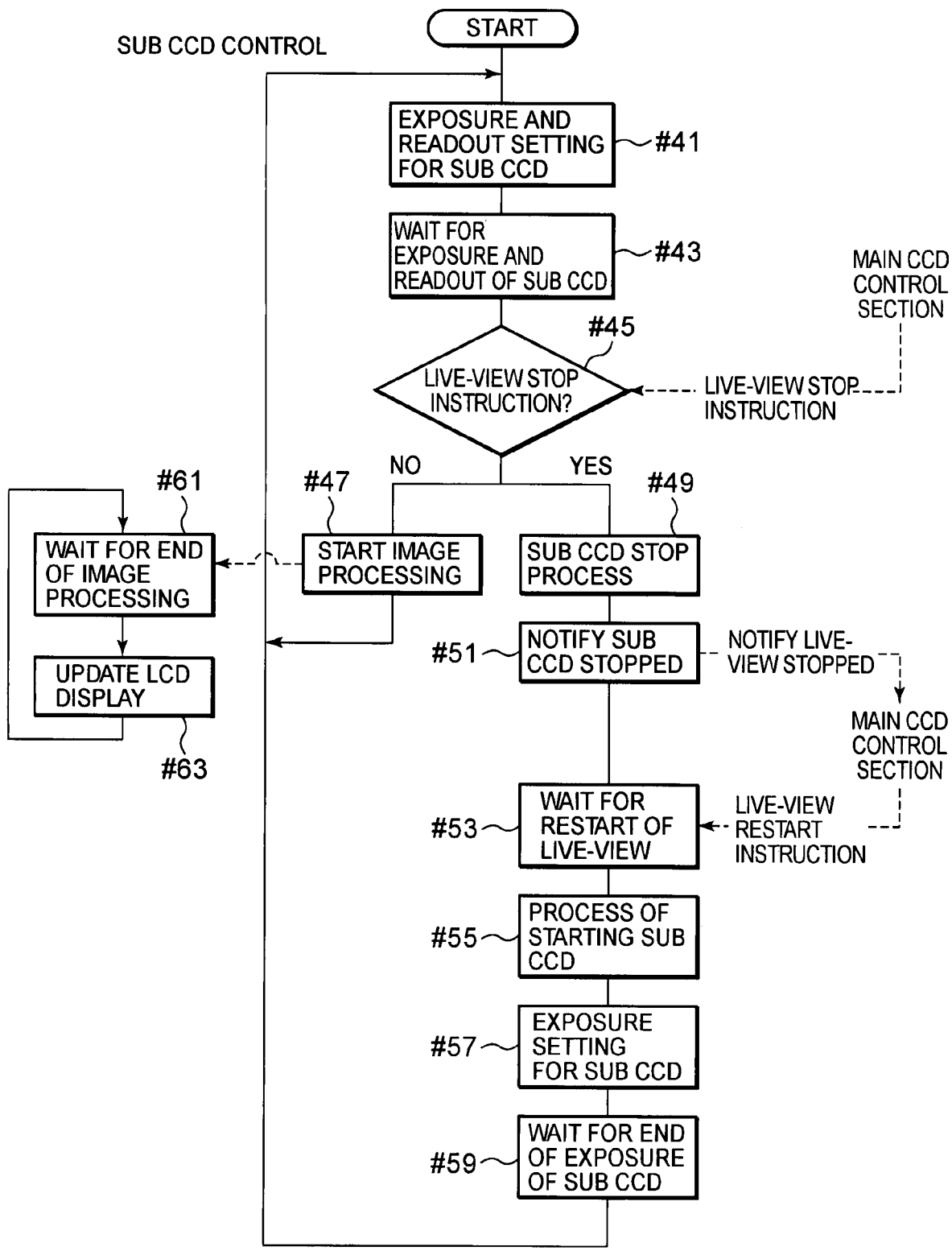
FIG. 3 is a flowchart mainly illustrating the operation of a sub CCD of the digital single-lens reflex camera according to the embodiment.

The flowchart for controlling the main CCD shown in FIG. 2 stands by until the second release switch is enabled (#01), while the flowchart for controlling the sub CCD shown in FIG. 3 starts when the digital single-lens reflex camera is powered on. At this instance, the movable mirror 12 is at a DOWN position, so that the light beam of the subject which has passed through the photographing lens 11 and reflected at the movable mirror 12 forms an image on the sub CCD 24.

The subject image is displayed on the LCD 31 based on the output of the sub CCD 24 until the second release switch is enabled. That is, power is supplied to the sub CCD 24, the TG 25 and the AFE 26 to activate those circuits, and the sync signal output from the SOC 30 is supplied to the sub CCD 24 via the changeover switch 28 and the TG 25. As a result, an analog image signal is read from the sub CCD 24 and is converted to a digital image signal by the AFE 26 after which the digital image signal is sent to the SOC 30 via the changeover switch 27. The SOC 30 performs image processing or so to display the subject image on the LCD 31. The main CCD 14 stays inactive until the shooting operation is instructed by the shutter release button, while the sub CCD 24 is in an operational state. The changeover switch 28 supplies the sync signal to the TG 25 while the changeover switch 27 selectively sends the output of the sub CCD 24 to the SOC 30.

Figure 4:
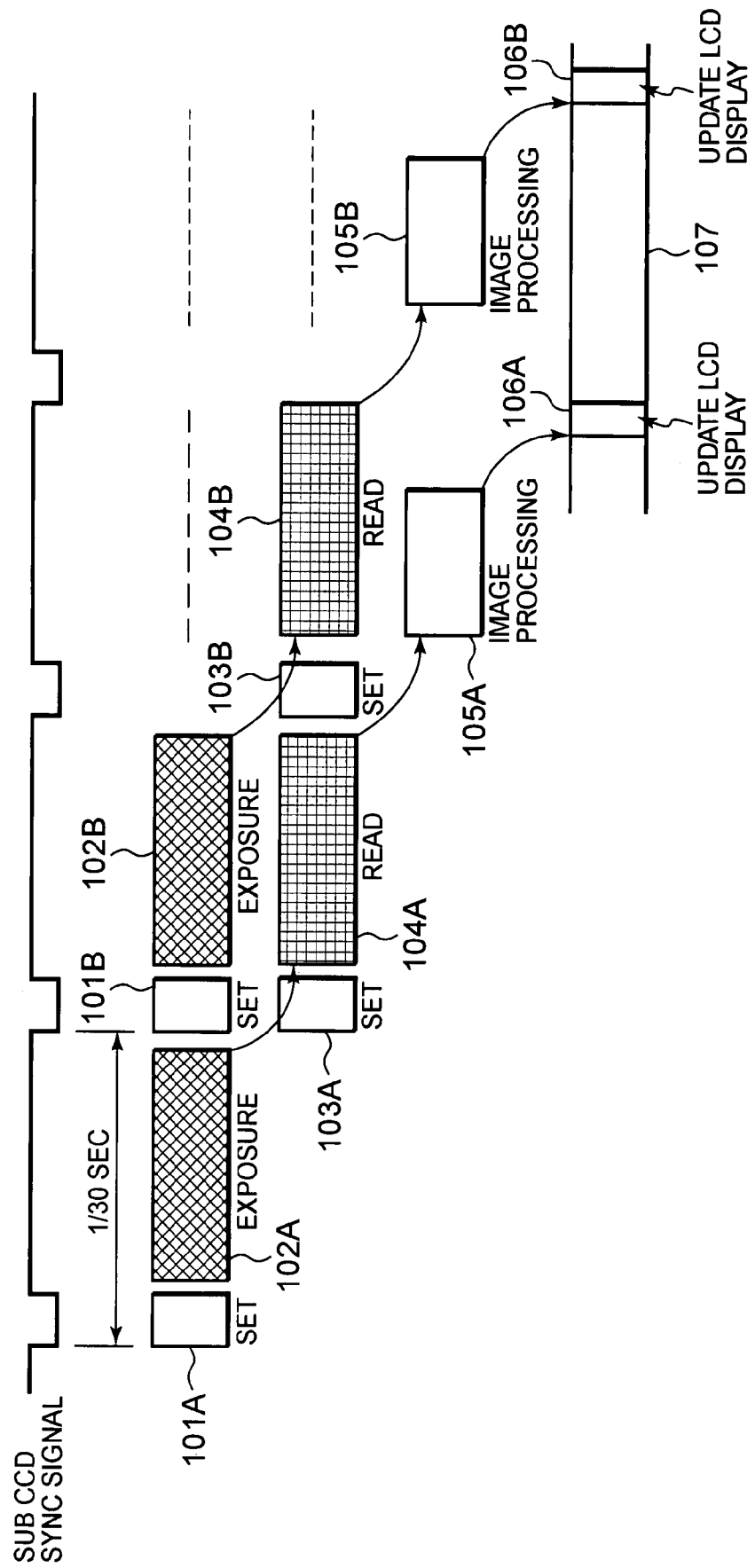
FIG. 4 is a timing chart mainly illustrating the operation of the main CCD of the digital single-lens reflex camera according to the embodiment.

A sequence of operations from reading of the output of the sub CCD 24 to the display on the LCD 31 is executed in synchronism with the CCD sync signal. When sub CCD control shown in FIG. 3 starts, first, sub CCD exposure and readout setting is executed (#41). In this setting operation, conditions for exposing a subject image with the sub CCD 24, for example, setting of the exposure time in 101A in FIG. 4 and setting of the read sensitivity in 103A in FIG. 4, are superimposed on the control serial signal which is sent to the TG 25 and the AFE 26. This setting is executed in response to the falling of the sync signal as shown in the setting 101A and setting 103A. That is, exposure setting is performed in 101A, and the sub CCD 24 performs an exposure operation 102A based on the setting 101A. Then, readout setting is performed in 103A, and a readout operation is executed at the timing from the TG 25. The readout setting performed in 103A is setting of, for example, the pulse waveform or so on a transfer path. With the setting done, an image signal is read from the sub CCD 24 (104A).

In step #43, the SOC 30 stands by or waits for completion of an exposure operation 102B in the sub CCD 24 and the readout operation 104A which is carried out at the same time as the exposure operation 102B. When the readout operation is terminated, the SOC 30 determines in step #45 whether or not a live-view stop instruction is given. While the live-view stop instruction is output in step #05 in the flowchart in FIG. 2, the SOC 30 goes to step #47 for the instruction has not been issued yet at this time. In this step, the SOC 30 performs various kinds of image processing (see 105A in FIG. 4), and updates the display of the LCD 31, i.e., writes display image data (see 106A in FIG. 4) when the image processing is finished (#61). When the display update is finished, the LCD 31 presents the display based on the updated image data (see 107 in FIG. 4). In this manner, the aforementioned settings (101A, 101B . . . ), the exposure (102A, 102B . . . ), the setting (103A, 103B . . . ), readout (104A, 104B . . . ), image processing (105A, 105B . . . ) and LCD display update (106A, 106B . . . ) are repeated to present the live-view display of the subject image on the LCD 31 based on the output of the sub CCD 24 until the second release switch is enabled, i.e., when the shooting operation is initiated.

Next, a description will be given of a case where the second release switch is enabled to initiate the shooting operation. When the first release switch is enabled before the second release switch is enabled, exposure calculation is performed based on the output of a photometer circuit (not shown) or a focusing operation is performed based on the output of the photometer circuit (not shown).

The SOC 30 waits for detection of the ON action of the second release switch in FIG. 2 (#01). When the second release switch is enabled, the SOC 30 goes to step #03. In this step, the upward movement of the movable mirror 12 is started so that the movable mirror 12 is moved to an UP position as indicated by a two-dot chain line in FIG. 1 (see FIG. 5). Subsequently, the live-view display is stopped (#05).

When it is instructed to stop the live-view display in connection with the sub CCD 24, the SOC 30 determines in step #45 in FIG. 3 that there is a live-view stop instruction, and goes to step #49 to perform a process of stopping the sub CCD 24, such as stopping the generation of the sync signal. As a result of perform the process of stopping the sub CCD 24, information acquired in exposure 102M and readout 104L is discarded without being used to be invalid as shown in FIG. 6.

In step #07 following the live-view stop instruction in step #05 in FIG. 2, the SOC 30 performs display update 108 of the LCD 31 (see FIG. 6). While the subject image on the LCD is updated based on the exposed and read subject image data in a sequence of processes from LCD update display 106A, 106B in FIG. 4 to LCD update display 106J, 106K in FIG. 6, the subject image is not displayed, but the whole screen is set to a black screen in LCD update display 108 in step #07. That is, unlike normal update of the subject image, the subject image is made to disappear and the whole screen is set to black to notify the photographer that the shooting operation has started. Although the whole screen is set to black in the embodiment, which is not restrictive, and various display methods are available, such as displaying the whole screen in monochrome or in a pattern, and displaying a character, a symbol or so. Any method can be employed as long as the photographer can recognize that the shooting operation is in progress.

The main CCD 14 waits for a stop notification to notify that the sub CCD 24 is stopped (#09). The sub CCD 24 notifies that the sub CCD 24 is stopped (#51) when the exposure operation and the readout process in step #49 are terminated. Thereafter, the sub CCD 24 stays stopped (#51, #53) until the shooting operation by the main CCD 14 is terminated and the display is enabled again based on the output of the sub CCD 24.

Upon reception of the notification that the live-view display is stopped based on the output of the sub CCD 24, the main CCD 14 proceeds to step #11. In this step, the SOC 30 performs initialization to initialize the main CCD 14 (110 in FIG. 5), then performs processes such as erasure of charges, initiation of the oscillation of the sync signal and transmission of information for the initialization (111 in FIG. 5). Thereafter, the SOC 30 waits for the completion of the upward movement of the movable mirror 12 (#13). When the upward movement of the movable mirror 12 is completed, the SOC 30' sets conditions for the exposure operation by the sub CCD 24 such as the exposure time and sensitivity (#15, 112 in FIG. 5), starts the exposure operation of the main CCD 14 (113 in FIG. 5), or starts the traveling of the shutter front curtain of the shutter 13 (#17). The SOC 30 waits for the elapse of the set exposure time (#19), and starts the traveling of the shutter rear curtain of the shutter 13 (#21) upon elapse of the set exposure time. Subsequently, the SOC 30 performs the readout setting for reading a pixel signal from the main CCD 14 (#23, 114 in FIG. 5), and starts moving the movable mirror 12 downward (#25). Thereafter, the SOC 30 reads a pixel signal from the main CCD 14 based on the setting information (115 in FIG. 5), and waits for termination of the readout operation (#27). When the readout operation is terminated, the SOC 30 performs a process of stopping the main CCD 14 such as stopping the oscillation of the sync signal (#29).

The shooting operation of the main CCD 14 in response to the action of the second release switch is terminated in step #29. Thereafter, the SOC 30 records the image signal acquired in the shooting operation in the memory card 33 and performs an operation of restarting the live-view display in parallel based on the output of the sub CCD 24. First, the SOC 30 issues an instruction to restart the live-view display to the sub CCD 24 (#31).

Upon reception of the restart instruction (#53), the sub CCD 24 performs initialization as an initiation process, such as starting of the oscillation of the sync signal, transmission of an initialization signal and erasure of charges (#55). Then, the SOC 30 performs the exposure setting (e.g., exposure time or so) of the sub CCD 24 (#57), starts exposure (102N in FIG. 6), and waits for the termination of the set exposure (#59). In this step, the frame is the first frame after restarting the live-view display, so that only exposure is performed and the readout setting is not needed. When the exposure is finished, the SOC 30 returns to step #41 to repeat the aforementioned steps such as exposure and readout setting.

Figure 5:
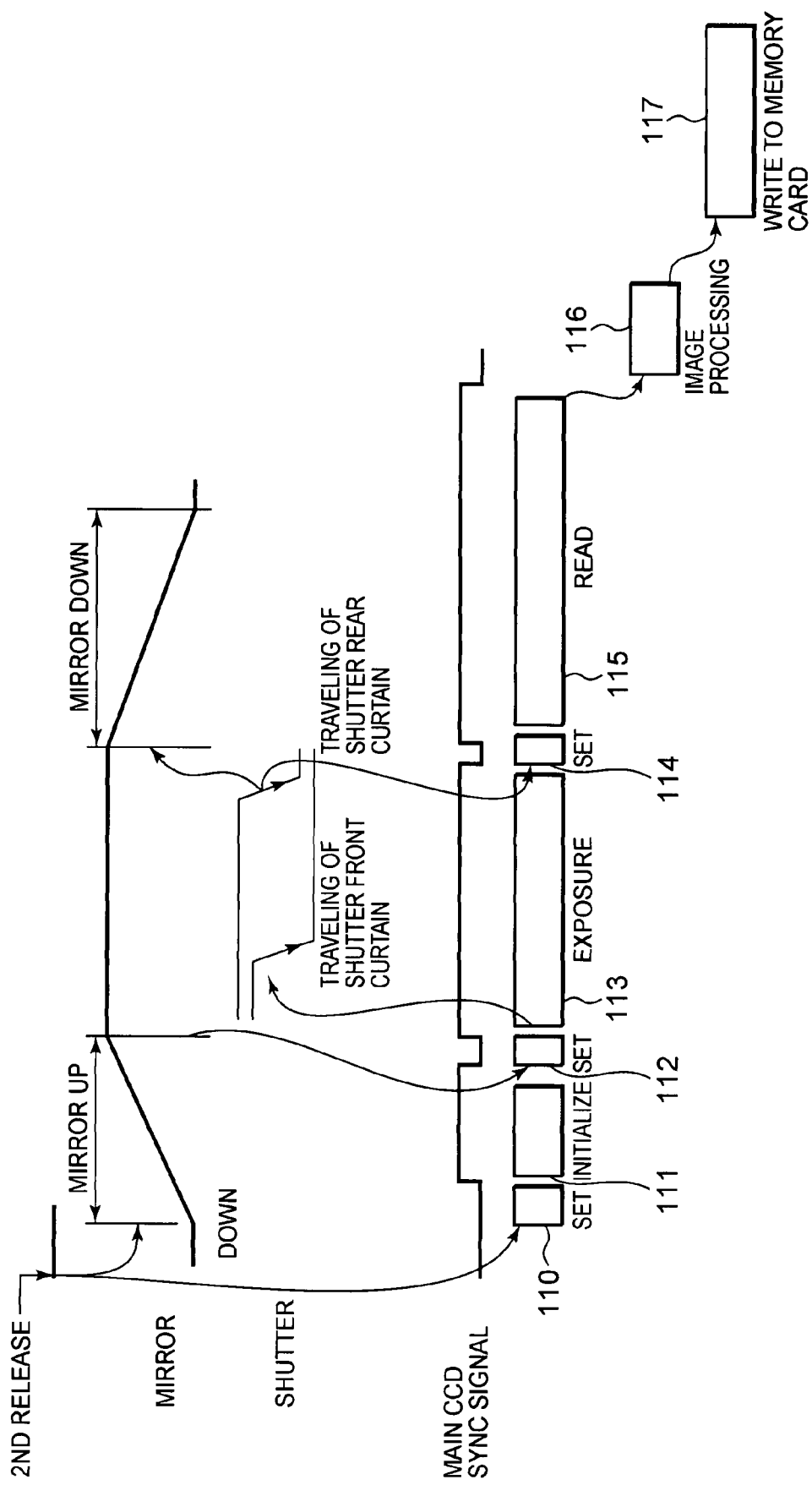
FIG. 5 is a timing chart mainly illustrating the operation of the sub CCD of the digital single-lens reflex camera according to the embodiment.

After issuing the live-view restart instruction (#31), the SOC 30 performs image processing on the image signal read from the sub CCD 24 for the main CCD 14 (116 in FIGS. 5 and 6). The image processing includes image compression of digital image data by the JPEG system or the like in addition to image processing, such as color correction, gamma (γ) correction, contrast correction, or monochrome/color mode processing. When the image processing is finished, the SOC 30 records the compressed image data in the memory card 33 in step #35, and terminates the control process for the main CCD 14 (117 in FIGS. 5 and 6).

The single-lens reflex camera according to the embodiment of the present invention is provided with the main CCD 14 as the first image pickup device which captures a subject image to be recorded formed by the photographing lens 11; the movable mirror 12, the half mirror 17 and the eyepiece lens 18 which constitute the finder optical system for optically display the subject image based on the light beam of the subject; the sub CCD 24 as the second image pickup device disposed in the subject image observing optical system; the changeover switch 27 as a changeover section to change the outputs of the main CCD 14 and the sub CCD 24; the LCD 31 as the display section to display the subject image based on the output of the main CCD 14 or the sub CCD 24 changed by the changeover switch 27; and the release switch 34 which operates in response to the action of the shutter release button to instruct a shooting operation. The single-lens reflex camera further has the SOC 30 as the control section which performs such control as to operate the sub CCD 24, cause the changeover switch 27 to select the output of the sub CCD 24 until the shooting operation is instructed by the shutter release button, and immediately operate the main CCD 14 and cause the changeover switch 27 to select the output of the main CCD 14 when the shooting operation is instructed by the action of the shutter release button. This can shorten the time lag when the shooting operation is initiated at the time of presenting a live-view display.

According to the embodiment, particularly, because an active CCD is changed from the sub CCD 24 to the main CCD 14 during upward movement of the half mirror in response to the action of the second release switch to start the shooting operation, the time lag originated from switching of the CCD can be made shorter.

The single-lens reflex camera according to the first embodiment of the invention is provided with the main CCD 14 as the first image pickup device to capture a subject image to be recorded, the sub CCD 24 as the second image pickup device to capture the subject image to be observed, and the LCD 31 as the display section to select either the main CCD 14 or the sub CCD 24 and display the subject image based on the output. When the shooting operation start instruction is given while the LCD 31 is displaying the subject image based on the output of the sub CCD 24, the display of the subject image is caused to disappear from the LCD 31, so that the photographer can easily view that the shooting operation is underway. According to the embodiment, particularly, the display of the subject image is made to disappear from the screen of the LCD 31 in response to the action of the screen of the second release switch. This can allow the photographer to easily understand that the operation is the shooting operation.

There are a conventional technique of notifying the photographer of a picture being shot by temporarily dropping the transmittance of the liquid crystal display in the optical viewfinder when a shutter release signal is output to set the exposure state (Japanese Patent Laid-Open No. 2000-10175), and a conventional technique of notifying stopping updating the live-view display to stroboscopic emission in an AE lock operation (Japanese Patent Laid-Open No. 2002-218318). However, Japanese Patent Laid-Open No. 2000-10175 is directed toward an optical viewfinder. While Japanese Patent Laid-Open No. 2002-218318 is directed toward a live-view display, the document fails to mention the display indicating that the shooting operation is progress. If an image is displayed on the display device based on the output of the image pickup device when the shutter release button is operated to start the shooting operation during live-view display, it is not clear when the shooting has started or whether or not the shooting operation is underway, thus leading to lower usability. According to the embodiment, when an instruction is given to start the shooting operation while the display section is displaying the subject image based on the output of the second image pickup device, however, the display section causes the display of the subject image to disappear. This can bring about an effect of allowing the photographer to easily see that the shooting operation is underway.

The process sequences of the flowcharts illustrated in FIGS. 2 and 3 of the embodiment can be changed as needed within the purpose of shortening the time lag. For example, while the exposure setting of the main CCD in step #15 is executed after the upward movement of the movable mirror 12 is completed, the procedures may not be limited to those mentioned above, but the exposure setting of the main CCD may be executed before completion of the upward movement of the movable mirror 12.

Although the single-lens reflex camera of the embodiment is configured to activate a live-view display when the single-lens reflex camera is powered on, an operation member to instruct a live-view display may be provided so that observation of the subject image through the ordinary optical viewfinder until the live-view display command is issued, and the sub CCD control as illustrated in FIG. 3 may be executed when the live-view display instruction is made.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A single-lens reflex camera having a reflection mirror that allows a subject image formed by a photographing lens to be observable through an optical viewfinder in a non-shooting mode and is retracted from an optical path to allow a first image pickup device for recording to capture the subject image formed by the photographing lens in a shooting mode, the single-lens reflex camera comprising:
   a second image pickup device that captures the subject image formed by the photographing lens for live-view observation in the non-shooting mode;
   a display section that displays at least the subject image captured by the second image pickup device as a live view;
   a release switch that instructs a shooting operation; and
   a control section that selectively controls the first and second image pickup devices,
   wherein when the shooting operation is instructed with the second image pickup device driven and a live-view displayed on the display section, the control section starts driving the reflection mirror to retract the reflection mirror from the optical path, and further controls to make the second image pickup device in a non-operating condition and starts driving the first image pickup device while the reflection mirror is being driven in a retracting direction.

2. The single-lens reflex camera according to claim 1, wherein the control section controls to discard captured data stored by the second image pickup device when the second image pickup device is set to be the non-operating condition.

3. The single-lens reflex camera according to claim 1, wherein the control section causes the live-view image displayed on the display section to disappear while capturing a still picture with the first image pickup device driven, thereby indicating that image capturing is in progress.

4. The single-lens reflex camera according to claim 1, wherein the display section shows that image capturing is in progress during the capturing of a still picture with the first image pickup device driven and the period after the capturing the still picture between the first image pickup device's transition to the non-operating condition and the start of drive of the second image pickup device.

5. The single-lens reflex camera-according to claim 4, wherein the display section shows that image capturing is in progress by giving a display in a single color displaying.

6. A single-lens reflex camera having a reflection mirror that allows a subject image formed by a photographing lens to be observable through an optical viewfinder in a non-shooting mode and is retracted from an optical path to allow a first image pickup device for recording to capture the subject image formed by the photographing lens in a shooting mode, the single-lens reflex camera comprising:

a second image pickup device that captures the subject image formed by the photographing lens for live-view observation in the non-shooting mode;

a display that displays at least the subject image captured by the second image pickup device as a live view;

a release switch that instructs a shooting operation; and a control section that selectively controls the first and second image pickup devices, wherein when the shooting operation is instructed with a live-view displayed on the display section, the control section controls to: start driving the reflection mirror to retract the reflection mirror from the optical path; set the second image pickup device in a non-operating condition; and make a display on the display section to display in a single color;

after that, when the capturing of a still picture caused by the driving of the first image pickup device is terminated, the control section further controls to start the driving of the second image pickup device and set the display section in a live-view display mode.

7. A control method for a single-lens reflex camera, comprising:

displaying a live-view captured by a second image pickup device on a display section;

moving a reflection mirror toward a retracted position in response to an instruction of a shooting operation; and taking, during movement of the reflection mirror to the retracted position, at least two actions of (1) stopping the second image pickup device, and (2) starting the driving of the first image pickup device to capture a subject image to be recorded.

* * * * *